Figure 9:
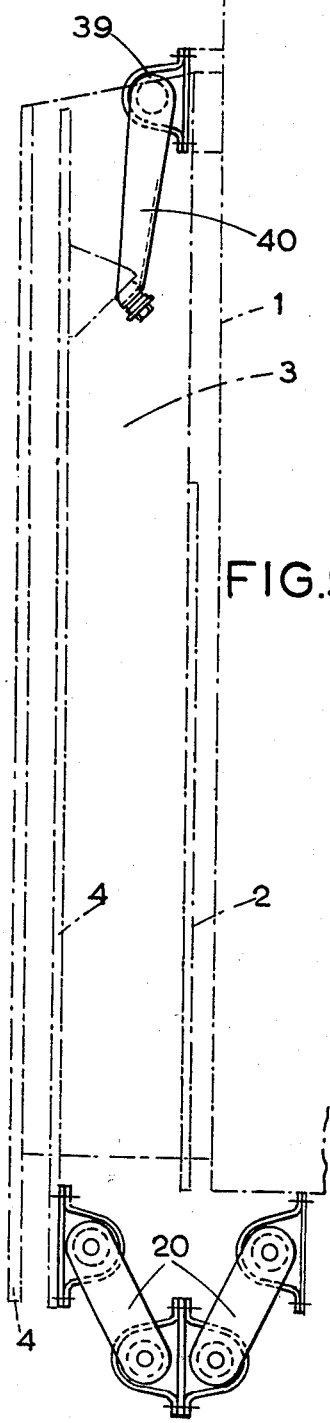

Oct. 6, 1959  A. E. MOULTON ET AL  2,907,281
VESTIBULE CONNECTION FOR RAILWAY AND LIKE VEHICLES
Filed Feb. 15, 1957  4 Sheets-Sheet 1
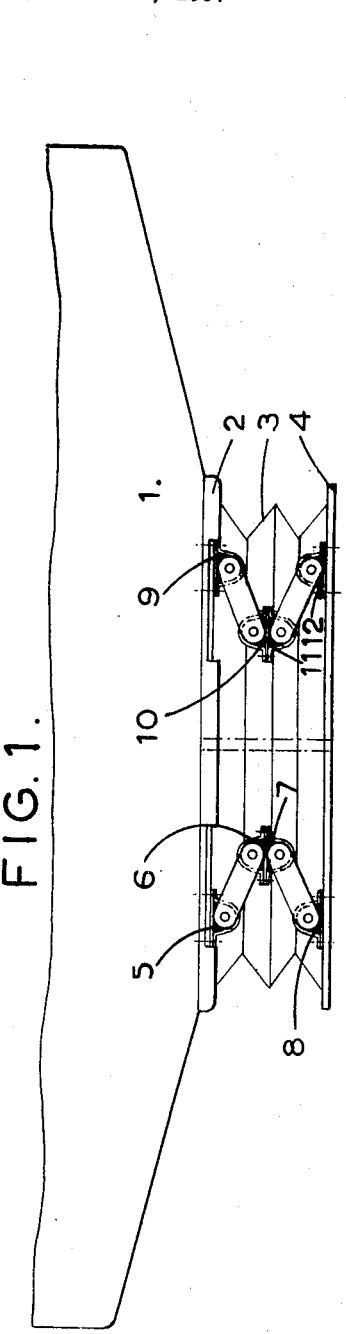
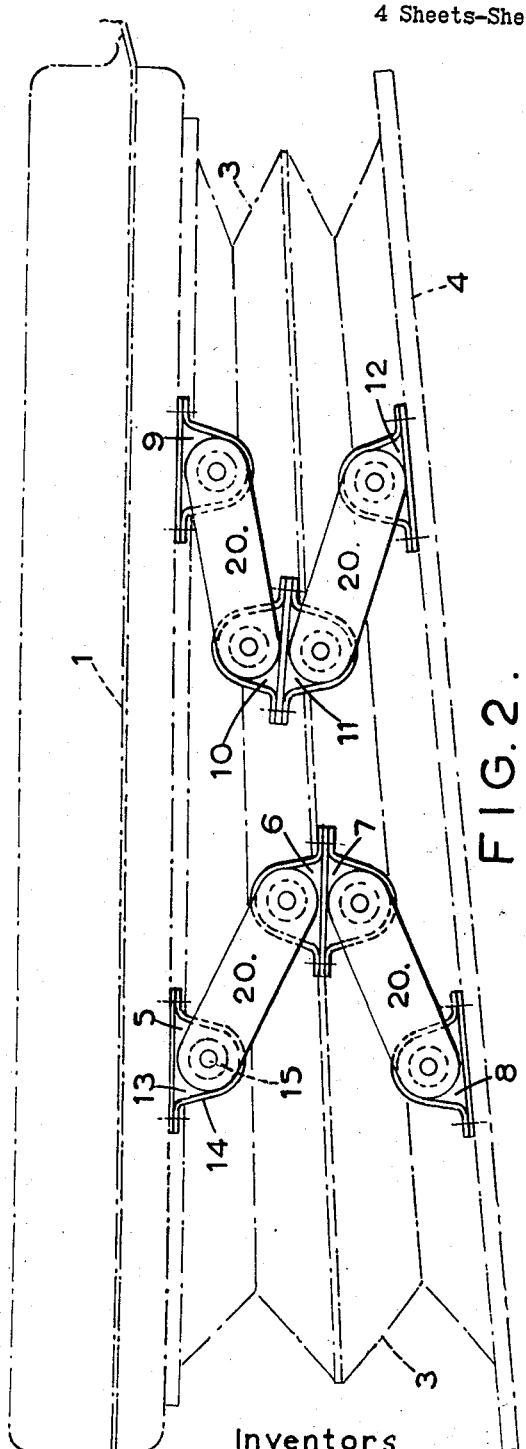
Inventors
ALEXANDER ERIC MOULTON
PHILIP WILSON TURNER
by
Shoemaker & Mattare
Attorneys Oct. 6, 1959  A. E. MOULTON ET AL  2,907,281
VESTIBULE CONNECTION FOR RAILWAY AND LIKE VEHICLES
Filed Feb. 15, 1957  4 Sheets-Sheet 2
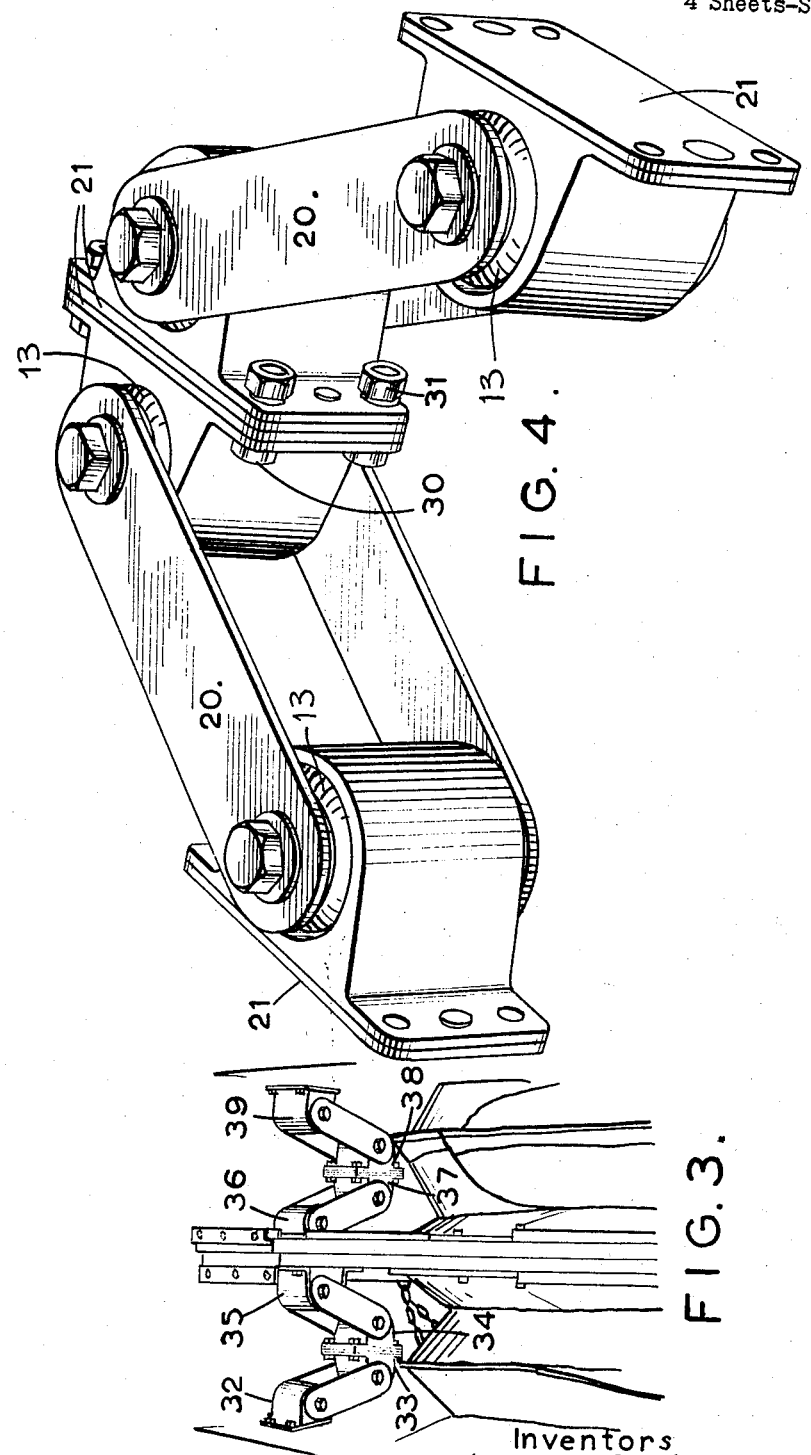
Inventors
ALEXANDER ERIC MOULTON
PHILIP WILSON TURNER
by Shoemaker & Mattare
Attorneys

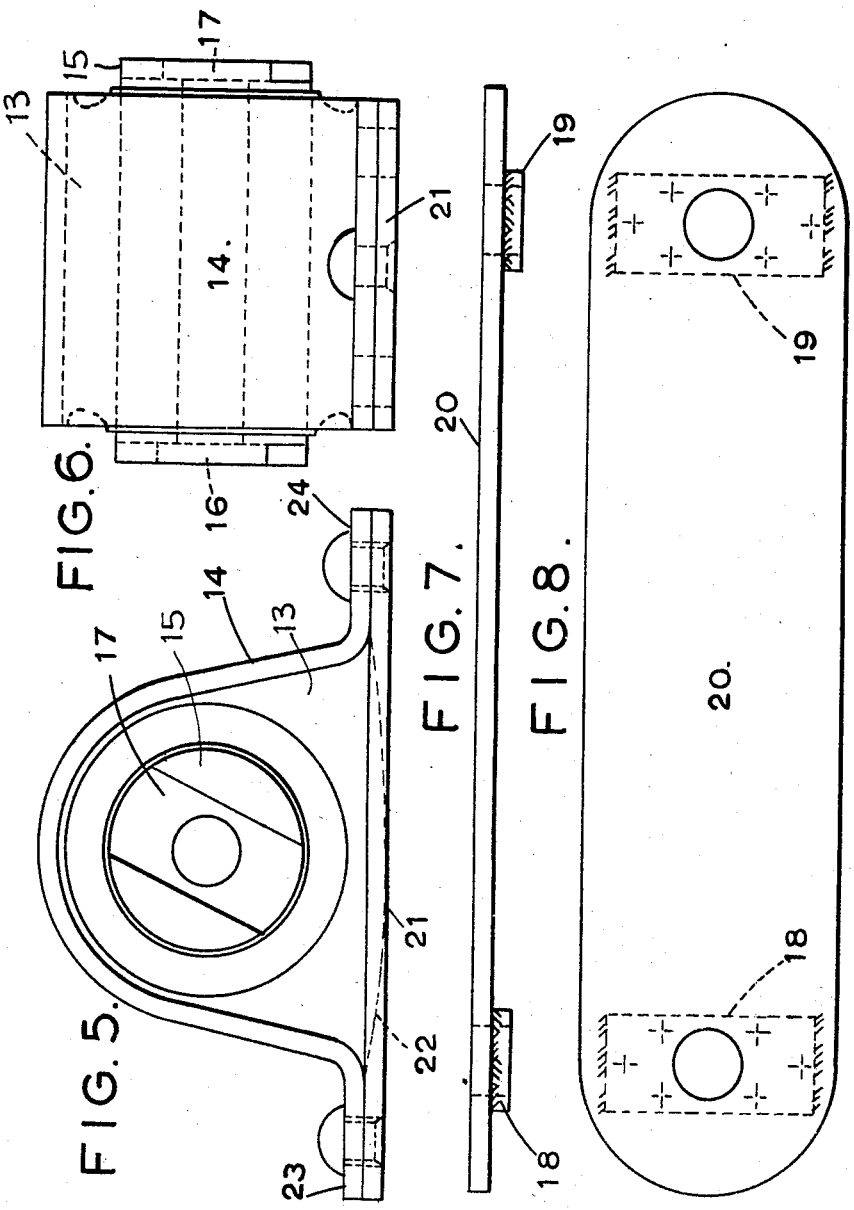

Oct. 6, 1959 A. E. MOULTON ET AL 2,907,281
VESTIBULE CONNECTION FOR RAILWAY AND LIKE VEHICLES
Filed Feb. 15, 1957 4 Sheets-Sheet 4

Inventors
ALEXANDER ERIC MOULTON
PHILIP WILSON TURNER
by Shoemaker & Mattare
Attorneys

United States Patent Office 2,907,281
Patented Oct. 6, 1959

2,907,281

VESTIBULE CONNECTION FOR RAILWAY AND LIKE VEHICLES

Alexander Eric Moulton, Bradford-on-Avon, and Philip Wilson Turner, Trumpington, England, assignors to George Spencer Moulton & Company Limited, London, England, a corporation of Great Britain Application February 15, 1957, Serial No. 640,448

3 Claims. (Cl. 105—10)

This invention relates to railway and like vehicles and has more especial reference to vestibule connections for corridor stock on passenger vehicles, the invention having for its object to provide improved arrangements for holding together the vestibule connections of adjoining vehicles of a train or the like.

Broadly stated, the present invention consists in the employment of rubber torsional shear springs to provide a silent, oil-less system, with no metallic bearings, to hold the vestibule diaphragms and adjoining faceplates in their articulated positions.

In the practice of the invention, the rubber torsional shear springs may serve to carry the weight of the vestibule or it may be preferred for this to be taken by the conventional sliding means associated with the footplate of the vestibule connection, and for the rubber springs to be operative to maintain the adjoining faceplates of the successive coaches in abutment and alignment when the train is rounding curves and traversing track inequalities.

The rubber torsional shear springs employed are conveniently of the kind forming the subject of Patent No. 2,684,845, the troughlike outer shells being secured to the faceplates which frame the bellows or flexible diaphragms of the vestibule connections.

Usually, one faceplate or frame is mounted on the end of the coach around the vestibule door and from it extends outwardly a bellows to an exposed faceplate or frame which, in service, abuts against its fellow on the next coach to provide a closed connection between the corridors of the two coaches.

As aforementioned, where torsional rubber shear springs according to Patent No. 2,684,845 are employed the outer metal shells of the springs are bolted to the faceplates or frames of the vestibule connection, and the inner metallic members of the springs are linked to each other after the fashion of lazy tongs with the rubber shear springs at the joints between the links.

In a specific embodiment, the rubber torsion bush mounted links are disposed in symmetrically arranged pairs, two pairs at the top and two pairs under the telescopic tread plate of the vestibule connection of each coach.

When adjoining corridor coaches are coupled, the exposed faceplates of their vestibule connections abut and close the linkages so that all the torsional rubber shear springs are stressed in such manner that the contacting faceplates are maintained in abutment even when the train is rounding curves of minimum permissible radius.

The invention will be further described with reference to the accompanying drawings where embodiments are illustrated by way of example and wherein:

Figures 1 and 2 are schematic plan views of the end of a passenger coach equipped with one form of the improved vestibule arrangement, Figure 2 showing how the rubber torsional shear springs enable the faceplates to rock to an angular position when the train is rounding curves so that adjoining faceplates of successive coaches remain in abutment.

Figure 3 is a perspective view of the vestibules of two successive passenger coaches connected together, and Figure 4 is a perspective view to a larger scale of a vestibule suspension unit, Figures 5 and 6 being a front view and elevation of one of the springs sold under the registered trademark Flexitor, for use in the unit, while Figures 7 and 8 are respectively a side and plan view of one of the links connecting the springs.

Figure 9 shows an alternative arrangement where the vestibule is suspended at the top by a single torsional rubber spring at each side of the bellows and at the bottom by two assemblies each of four rubber torisonal shear springs having their axes horizontal.

Figure 10:
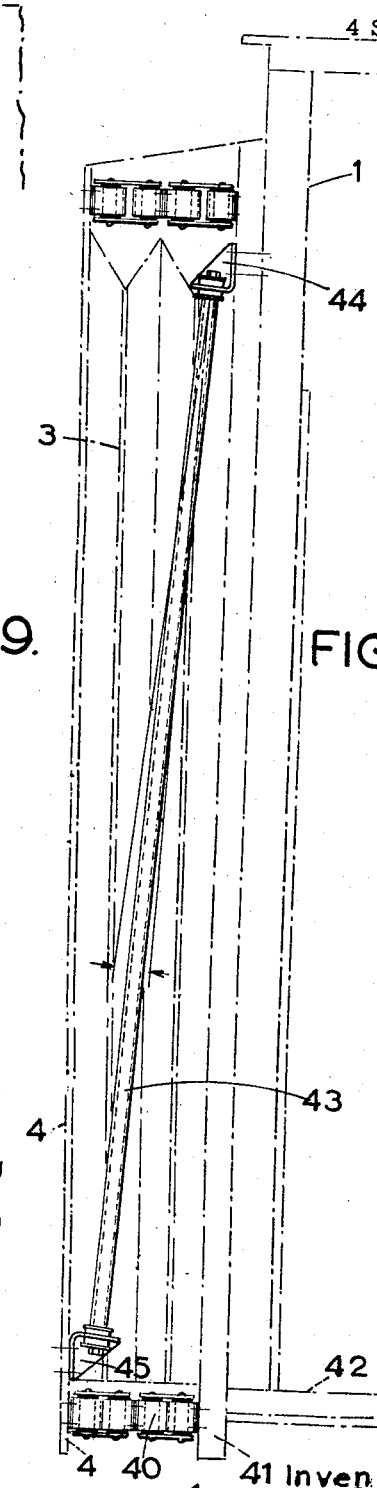

Lastly Figure 10 is a diagrammatic side elevation of a vestibule gangway.

Referring now to the drawings but first more particularly to Figures 1 and 2, in these embodiments 1 generally designates the end of a railway passenger coach having a door frame 2 surrounding an aperture for a vestibule consisting of a flexible diaphragm or bellows 3 terminating in its outer end in an exposed face plate 4 adapted to abut and mate with the corresponding faceplate of a vestibule bellows of the next coach.

In these embodiments 5, 6, 7 and 8 generally designate rubber torsional shear springs above the bellows 3 at one side of the vestibule gangway and 9, 10, 11 and 12 represent four rubber torsional shear springs above the other side of the gangway.

As in the aforementioned Patent No. 2,684,845 these torsional rubber shear springs comprise bodies or rubber 13 having their external surfaces bonded in trough like metal shells 14 but free across the mouth of the trough, and having their inner surfaces bonded to shafts 15.

In Figures 4 to 7 it will be noted that the shafts have recessed slots 16 and 17 at each end of the rubber body 13 co-operating with spigots 18 and 19 one near each end of a link 20 one of which links is shown in Figures 7 and 8 the links being attached to the shafts by means of a through bolt and nut, the troughs of the shells 14 are closed by filling plates 21 which as indicated by the dotted line 22 in Figure 5 apply initial compression to the rubber across the mouth of the trough, the outer shell being flanged at 23 and 24 to form bolting flanges by which the rubber suspension may be bolted to the door frame 2 of the coach or to the face plate 4 of the vestibule bellows. In all the individual rubber suspensions illustrated, four such rubber torsional shear springs are shown assembled to form each suspension unit by two pairs of links 20, the outer troughlike shell of the Siamese bushes or springs 6 and 7 on the one hand and 10 and 11 on the other, being bolted together by bolts 30 and nuts 31. Four such nuts and bolts are employed one at or near the corner of each filler plate 22.

As is clearly evident from Figures 1 and 2 the improved suspension arrangements provide for articulation of the vestibule as requisite when cushioning buffing and draft thrusts and the inclination of the faceplate when rounding curves, the rubber torsional shear springs providing an oil-less system, with no metallic bearings and to hold the adjoining frame plates in their appropriate position abutting each other and forming a covered gangway between the successive coaches of the train.

In the embodiments illustrated in Figures 1 and 2 two such suspension units are employed above the vestibule, while in Figure 9 at the top a single torsional rubber spring 39 having a depending arm 40 is used at each side of the bellows 3.

At the bottom, beneath the tread plate, there is an assembly of four torsional shear springs similar to that illustrated at Figure 5 but arranged with the axes of the springs horizontal at each side of the vestibule connection, one end torsional spring unit being bolted to the end of the vehicle structure and the other being similarly bolted to the face plate 4 of the vestibule connection. In Figure 10 similar units are arranged both above and below the bellows 3, the lower unit 40 conveniently being bolted on the one hand to the coach frame 41 above the head stock while its other end is bolted to the faceplate 4 beneath the gangway floor the level of which in Figure 9 is shown by an interrupted line 42. 43 is an approximately vertical, diagonal tie rod having a rubber connection at its upper end with a bracket 44 on the door plate and a similar connection at its lower end with a bracket 45.

By the present invention an improved silent and oil-less spring system for the vestibule connections of corridor stock is obtained.

What we claim is:

1. In combination with a railway coach having a door frame opening at one end, a flexible bellows having one end thereof secured to said door frame in surrounding relation to the door opening presented thereby, and a face plate carried by the opposite end of said bellows, a link assembly connected to and extending between said door frame and said face plate to maintain said face plate spaced from the door frame and to resiliently resist movement of the face plate toward the door frame, said link assembly including two pairs of rubber torsional shear springs, each having an apertured base plate rigid therewith for mounting purposes, the base plate of one spring of one of said pairs being abutted against and mounted upon said door frame and the base plate of one spring of the other pair being abutted against and mounted upon said face plate opposite said one spring mounted on the door frame, the remaining springs of the two pairs having their base plates disposed in face-to-face contact and rigidly secured together, and link members interconnecting the springs of each pair, the link members connecting one pair forming an acute angle with the link members connecting the other pair.

2. The combination as defined in claim 1 wherein each of said springs includes an outer body secured to its associated base plate, an inner metallic element and a rubber sleeve bonded to the outer body and the inner element.

3. The combination as defined in claim 2 wherein the opposite ends of said inner element are provided with transverse grooves therein, said links being provided with rectangular strap pieces at the opposite ends thereof received in said grooves whereby the inner elements move with said links.

References Cited in the file of this patent

UNITED STATES PATENTS

| | | |
|---|---|---|
| 500,413 | McKeen | June 27, 1893 |
| 875,642 | Arey | Dec. 31, 1907 |
| 2,062,560 | Decker | Dec. 1, 1936 |
| 2,268,439 | Beebe | Dec. 30, 1941 |
| 2,385,138 | Keller | Sept. 18, 1945 |